(12) United States Patent
Yeh (10) Patent No.: US 9,242,707 B2
(45) Date of Patent: Jan. 26, 2016

(54) FIN AND ACCESSORY ASSEMBLY AND WATER CRAFT HAVING THE SAME

(71) Applicant: Tzong In Yeh, Fremont, CA (US)

(72) Inventor: Tzong In Yeh, Fremont, CA (US)

(*) Notice: Subject to any disclaimer, the term of this patent is extended or adjusted under 35 U.S.C. 154(b) by 0 days.

(21) Appl. No.: 14/627,520

(22) Filed: Feb. 20, 2015

(65) Prior Publication Data

US 2015/0166153 A1 Jun. 18, 2015

Related U.S. Application Data

(63) Continuation-in-part of application No. 13/354,246, filed on Jan. 19, 2012, now abandoned.

(51) Int. Cl.
| | |
|---|---|
| *B63B 35/79* | (2006.01) |
| *B62B 17/00* | (2006.01) |
| *A63C 5/06* | (2006.01) |

(52) U.S. Cl.
CPC ................. *B63B 35/793* (2013.01); *A63C 5/06* (2013.01); *B62B 17/00* (2013.01)

(58) Field of Classification Search
CPC ....................................................... B63B 35/793
See application file for complete search history.

(56) References Cited

U.S. PATENT DOCUMENTS

| | | | | |
|---|---|---|---|---|
| 3,579,681 | A | * | 5/1971 | Pope, III et al. ................ 441/79 |
| 5,464,359 | A | * | 11/1995 | Whitty ............................ 441/79 |
| 5,830,025 | A | | 11/1998 | Fleming |
| 6,068,531 | A | * | 5/2000 | Patterson ........................ 441/74 |
| 6,139,383 | A | | 10/2000 | Jolly et al. |
| 6,213,044 | B1 | | 4/2001 | Rodgers et al. |
| 6,257,941 | B1 | * | 7/2001 | Rhynsburger .................. 441/79 |
| 7,108,571 | B2 | | 9/2006 | Geraghty |
| 2004/0035346 | A1 | | 2/2004 | Davey et al. |
| 2008/0311807 | A1 | * | 12/2008 | Luke et al. ...................... 441/79 |

* cited by examiner

*Primary Examiner* — Edwin Swinehart
(74) *Attorney, Agent, or Firm* — Muncy, Geissler, Olds & Lowe, P.C.

(57) ABSTRACT

A fin assembly includes a fin, a mounting base and a socket base. The mounting base is provided for permanent inclusion within a watercraft. The mounting base defines a cavity that is adapted for receiving the socket base. The socket base further includes a cavity adapted for receiving the fin. The socket base is further adapted for receiving an accessory.

11 Claims, 9 Drawing Sheets

FIN AND ACCESSORY ASSEMBLY AND WATER CRAFT HAVING THE SAME

CROSS REFERENCE TO RELATED APPLICATION

This is a continuation-in-part of the co-pending U.S. Ser. No. 13/354,246 application filed on Jan. 19, 2012.

BACKGROUND OF INVENTION

1. Field of Invention

This invention generally relates to a fin assembly and more particularly to a fin and accessory assembly adapted to reduce the likelihood of damage to the watercraft when subjected to impacts or forces.

2. Related Prior Art

U.S. Pat. No. 6,139,383 or 6,213,044 discloses a conventional fin assembly for use in a water craft, comprising a fin box and a fin. The fin box is installed in a board body of the water craft and secured in the latter with adhesive or fasteners. The fin has a spigot received in a recess of the fin box. Screws are used, in an oblique manner, for securing the spigot in the recess of the fin box. In this way, the bonding strength between the fin box and the board body is relatively weaker than that between the fin box and the fin. Therefore, there exists a problem that if the fin is subject to impacts or forces, the fin box may easily be split off or ripped from the board body and cause the board body to be damaged or broken.

U.S. Pat. No. 6,068,531 discloses a surfboard with another type of fin assembly having a fin box and a fin inserted in the fin box. Specifically, the fin box penetrates a board body of the surfboard. A threaded screw is introduced from the top box part to the lower box part of the fin box in order to hold the fin in the fin box. Nevertheless, this structure does not solve the aforementioned problem of causing damage to the board body when serious impacts or forces are exerted on the fin.

SUMMARY OF INVENTION

It is a primary object of the invention to provide a fin assembly which can effectively serve as a buffer to reduce or eliminate damage impacted to a board or other watercraft using such a fin assembly.

It is another objective of the invention to provide watercraft and snow craft products advantageously including the fin assembly, including but not limited to surfboards, sailboards, body boards, paddleboards, wind surfers, kite surfers, snow sleds, etc.

In one embodiment, the fin assembly comprises a mounting base, a socket base and a fin. The mounting base is provided for permanent inclusion in the board or watercraft. The mounting base defines a cavity in which the socket base may be installed. The fin includes a fin body and a spigot extending from the fin body. The fin spigot is inserted in a cavity or recess within the socket base.

Preferably, the fin assembly further comprises a fastening member or members to hold the fin within the socket base. Specifically, the socket base defines a passageway obliquely extending from the outer surface of the socket base and intersecting the recess of the socket base, and the fastening screws or other fastening element is disposed in the passageway and extending into the recess of the socket base and in contact with the spigot of the fin.

Preferably, the socket base has at least one rib, tooth or other retaining shape formed on at least one side, and the mounting base further has at least one groove or other complimentary retaining shape defined in a wall surface of the cavity (opposing the retaining shape on the socket base) for reception of the tooth of the socket base. This ensures the engagement of the socket base and the mounting base. The socket base and the mounting base may further be bonded with an adhesive or sealant to further secure or seal the interconnection.

Moreover, a plurality of reinforcing ribs or rib like structures may be formed on the mounting base to enhance the bonding strength between the board body and the mounting base.

In comparison with the prior arts, the fin assembly of the present invention includes the socket base that indirectly mounted in the board body via the mounting base and can effectively distribute and cushion impacts and forces from the fin to the board body so that the board body is well protected from damage. Furthermore, since the bonding strength between the mounting base and the board body is greater than that between the mounting base and the socket base, if the fin is subjected to serious impact, only the fin and the socket base together can split off from the mounting base and thereby the board body is protected.

Other objectives, advantages and features of the present invention will be apparent from the following description referring to the attached drawings.

BRIEF DESCRIPTION OF DRAWINGS

The invention will be more clearly understood after referring to the following detailed description read in conjunction with the drawings wherein.

DETAILED DESCRIPTION OF EMBODIMENTS

Figure 1:
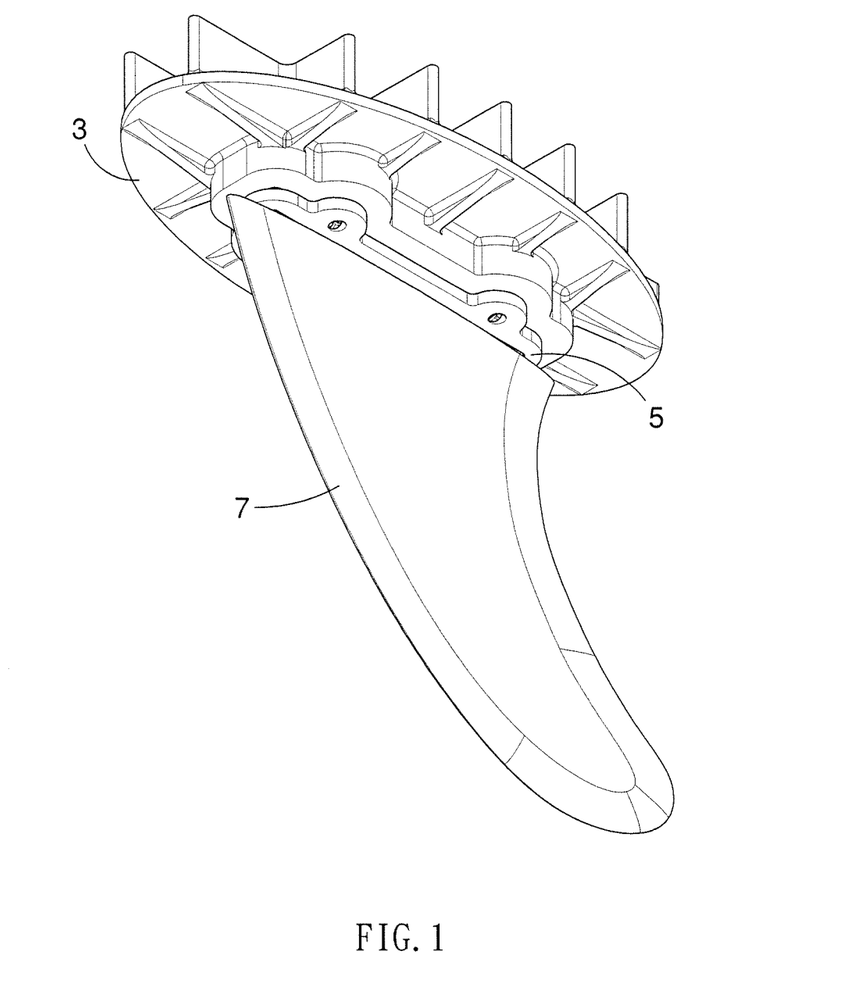
FIG. 1 is a perspective view of a fin assembly according to one embodiment of this invention.
Figure 2:
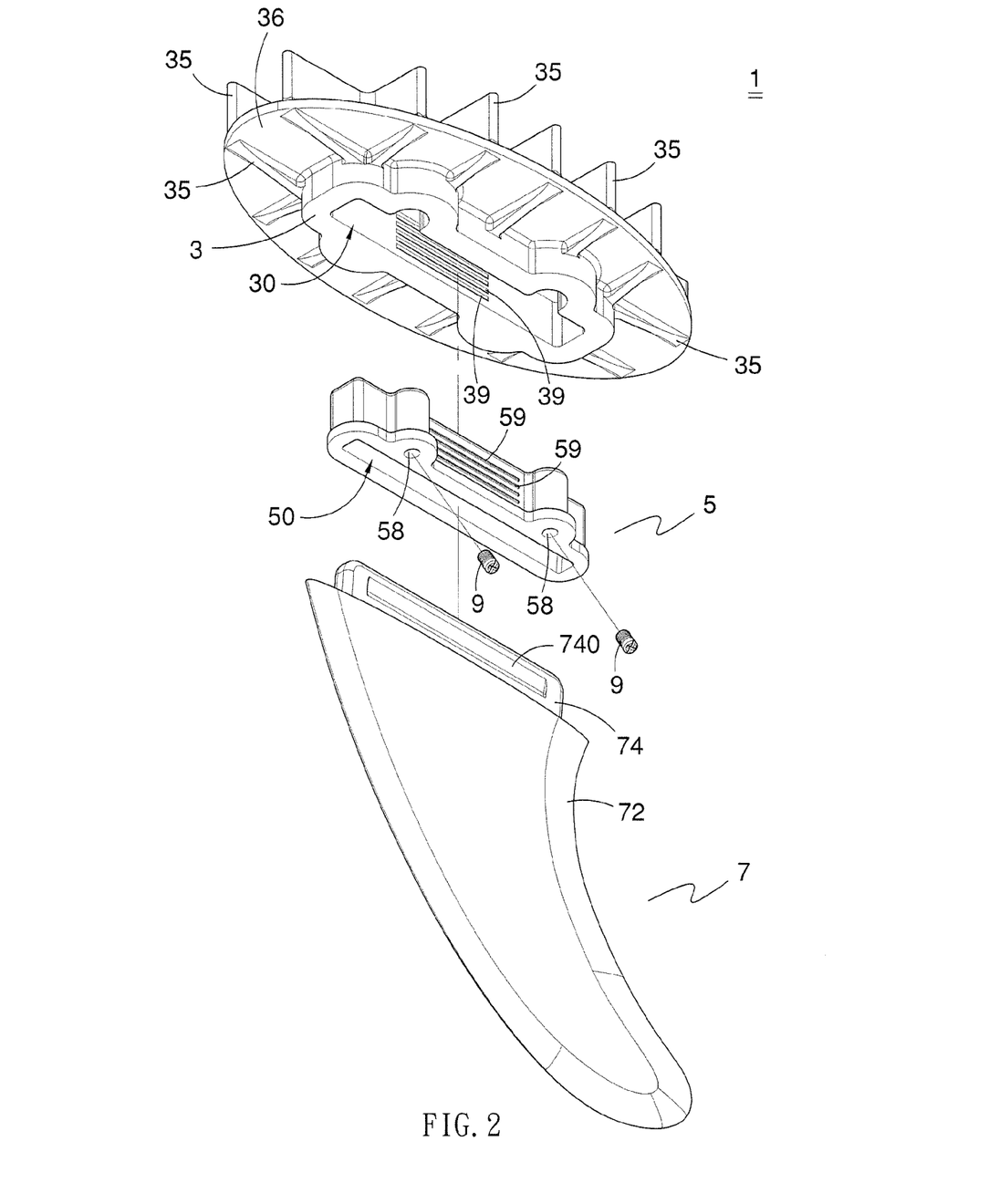
FIG. 2 is an exploded perspective view of the fin assembly of FIG. 1.
Figure 3:
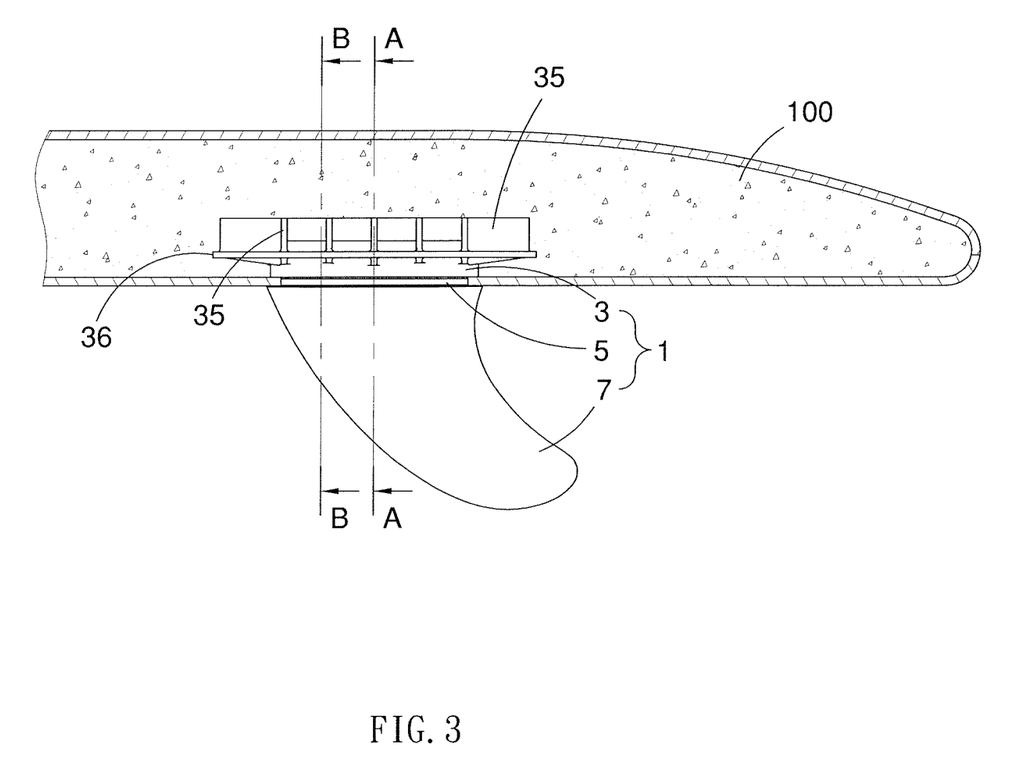
FIG. 3 is a partial sectional view of a water craft including the fin assembly of FIG. 1.

With reference to FIGS. 1 and 2, a fin assembly 1 in accordance with a preferred embodiment of the present invention comprises a mounting base 3, a socket base 5 and a fin 7. The fin assembly 1 is adapted for use with a water craft, such as a surfboard, paddleboard, wind surfboard, kite board, body board, sailboard, boat, water sled, snow sled, or any other type of craft utilizing a fin or fins. As shown in FIG. 3, the fin assembly 1 is attached to a bottom or underside of a board body 100. The mounting base 3 of the fin assembly 1 is adapted for permanent attachment or inclusion within the lower surface of the board 100. As shown in FIG. 2, the mounting base 3 includes a cavity 30 in which the socket base 5 may be removably or permanently inserted. Similarly, the socket base 5 includes a recess 50 in which the fin 7 may be inserted.

Figure 4:
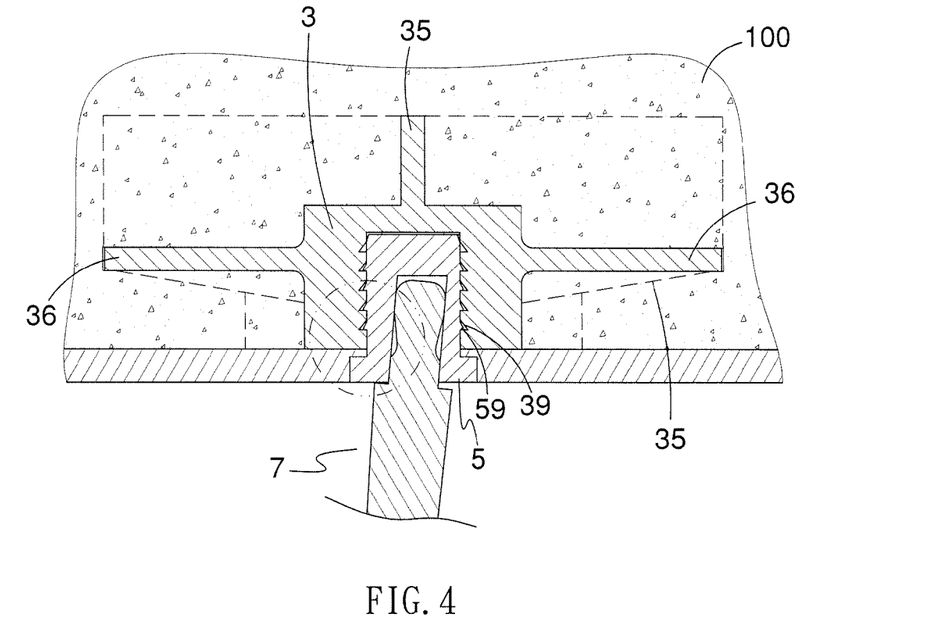
FIG. 4 is a partial sectional view of the water craft taken along line A-A of FIG. 3.

The present invention includes a manufacturing method for combining the mounting base 3 and the board body 100. Firstly, the mounting base 3 is placed along the lower surface within a mold where the board body 100 is to be formed and shaped. Next, a foaming material for the board body 100 is placed within and preferably injected into the mold. The foaming material is then preferably subjected to heat treatment. After the foaming process, the foaming material is advantageously foamed and the mounting base 3 is tightly engaged and formed as part of the lower surface of the board 100. Preferably, as shown in FIGS. 2 to 4, the mounting base 3 is formed with a plurality of reinforcing members or ribs 35 which is about the cavity 30 to increase the strength and rigidity of the mounting base. Other molding materials such as resins or non-foaming plastics may be similarly used or combinations thereof. Alternatively, the method of manufacture may utilize a laminating process without the need for molding and may utilize laminated materials or combinations thereof.

Figure 5:
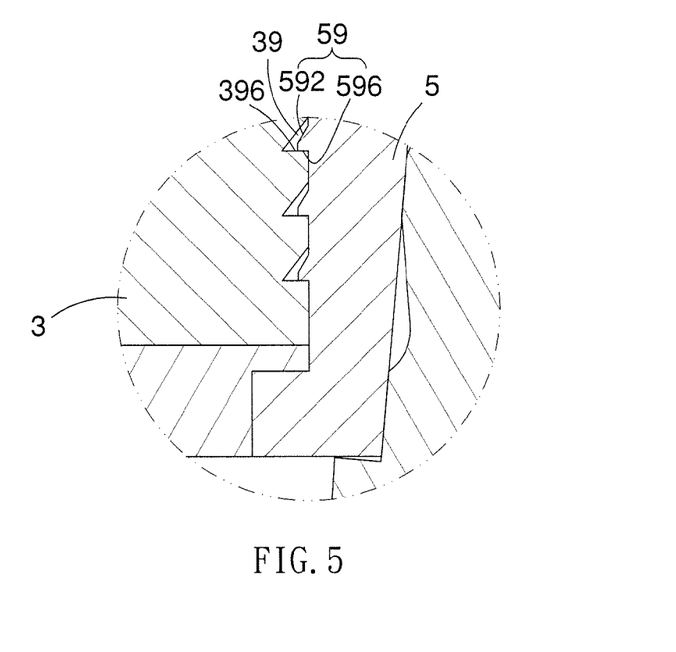
FIG. 5 is a partial enlarged view of the water craft of FIG. 4.

Referring back to FIGS. 2 and 4, the socket base 5 is advantageously adapted to snugly fit within the cavity 30 of the mounting base 3. Preferably, the mounting base 3 has a plurality of ribs or grooves 39 defined in an inner wall surface of the cavity 30 and adapted to engage opposing grooves or ribs 59 within the socket base 5 such that the socket base 5 can be firmly engaged with the mounting base 3 with the ribs or teeth 59 being lodged in the grooves 39. In particular, as depicted in FIG. 5, each of these ribs or teeth 59 has an oblique guiding surface 592 and a horizontal obstructing surface 596. The oblique surfaces 592 of the ribs 59 are defined to guide the socket base 5 smoothly and fully into the cavity 30 of the mounting base 3. The horizontal obstructing surfaces 596 of the teeth 5 are defined to abut against horizontal wall surfaces 396 of the grooves 39 in order to avoid the socket base 5 being withdrawn from the cavity 30 of the mounting base 3. Preferably, the socket base 5 and the mounting base 3 may be further bonded with an adhesive to secure against the withdrawal of the socket base 5.

Figure 6:
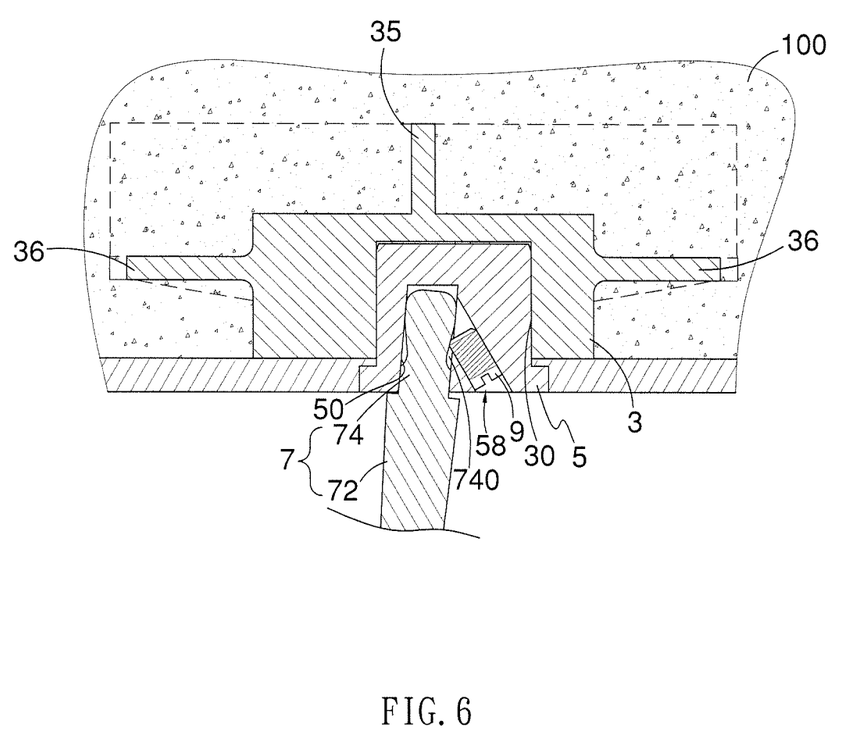
FIG. 6 is a partial sectional view of the water craft taken along line B-B of FIG. 3.

Referring now to FIGS. 2 and 6, the socket base 5 defines at least one passageway 58 obliquely extending from the bottom surface of the socket base 5 and intersecting the recess 50 of the socket base 5. The fin 7 includes a fin body 72 and a spigot 74 extending from the fin body 72. The spigot 74 is received in the recess 50 of the socket base 5 and is secured in the socket base 5 with at least one fastening element 9, such as screws. Specifically, the fastening element 9 is disposed in the passageway 58 and extending into the recess 50 of the socket base 5 and in contact with the spigot 74 of the fin 7. Preferably, a depression 740 is defined in a side of the spigot 74 to receive the distal end of the fastening element 9.

As best seen in FIG. 3, the fin 7 is indirectly mounted in the mounting base 3 via the socket base 5 and finally connected with the board body 100. In this manner, the socket base 5 is adapted as a buffer to absorb and cushion impacts transferred from the fin 7 to the mounting base 3 as well as the board body 100. This greatly reduces the impacts onto the mounting base 3 and the board body 100 and therefore increase the lifetime of the board body 100 in particular.

Figure 7:
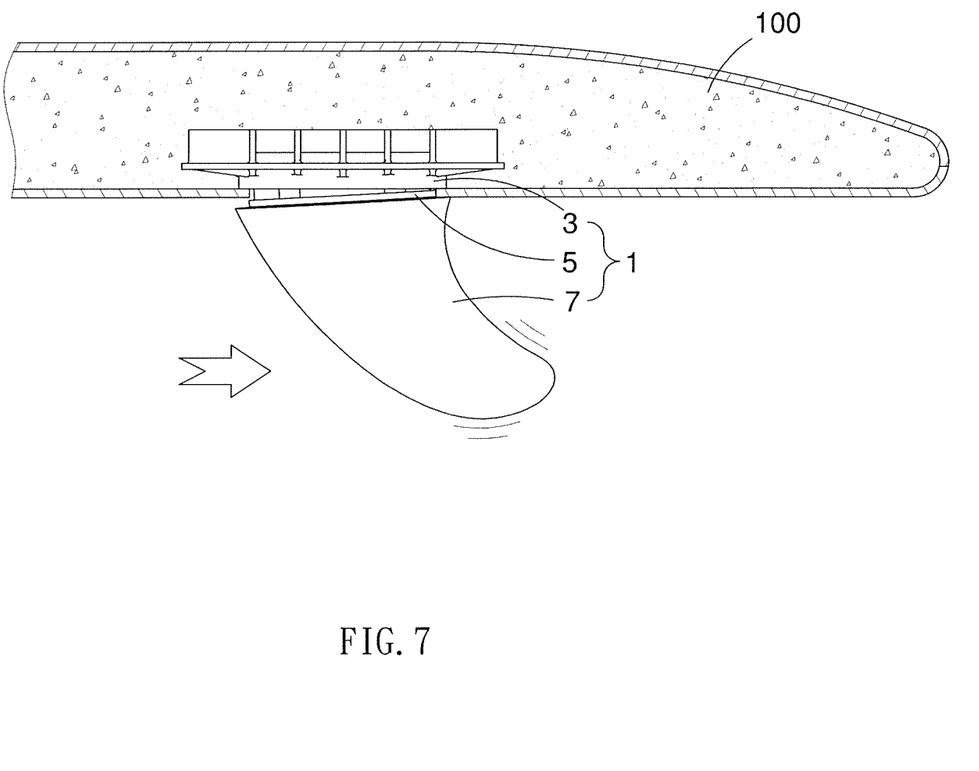
FIG. 7 is a view similar to FIG. 3, illustrating that a fin of the fin assembly is subjected to impacts.

Referring now to FIG. 4, the socket base 5 is smaller than the mounting base 3, the outer surface of the mounting base 3 is embedded in the board body 100 (except the bottom surface of the mounting base 3), it reveals that the bonding surface area between the mounting base 3 and the board body 100 is larger than the bonding surface area between the socket base 5 and the mounting base 3. Thus, the bonding strength between the mounting base 3 and the board body 100 is much greater than that between the mounting base 3 and the socket base 5 such that when the fin 7 is subjected to serious impacts or forces, the fin 7 together with the socket base 5 may be loosened and removed from the mounting base 3, as shown in FIG. 7. This greatly reduces the risk of damage to either the mounting base 3 or the board 100 or the two together. If force against the fin 7 does not knock off or otherwise remove the socket base 5 and the fin 7 from the mounting base 1, the water craft (board 100) may be quickly put back into service by inserting a new socket base 5 and fin 7 into the undamaged combination of the mounting base 1 and the board body 100. That is, the mounting base 1 and the board body 100 can be re-used and less waste is produced. The present invention also advantageously allows a user to install the fin 7 just prior to actual usage further reducing the risk of impact against the fin.

Besides, Referring now to FIGS. 2 to 4, preferably, the mounting base 3 is formed with a blocking member 36, the blocking member 36 extends from the periphery of the mounting base 3. From FIGS. 2 to 3, the blocking member 36 is just like a big hook firmly hooking the board body 100, so that the bonding strength between the mounting base 3 and the board body 100 is further reinforced and that the mounting base 3 is difficult to be separated from the board body 100. In another word, the socket base 5 is relatively easier to be separated from the mounting base 3. Thus, when the fin 7 is impacted by a mighty force, the fin 7 would either be separated from the socket base 5 or be separated from the mounting base 3 together with the socket base 5, meanwhile, the mounting base 3 still stays in the inner of the board body 100. Preferably, the ribs 35 are able to increase the bonding surface area between the mounting base 3 and the board body 100 so as to increase the bonding strength between the mounting base 3 and the board body 100. The blocking member 36 is also able to increase the bonding surface area between the mounting base 3 and the board body 100 so as to increase the bonding strength between the mounting base 3 and the board body 100.

No matter by the blocking member 36 hooking the board body 100 or increasing the bonding surface area between the mounting base 3 and the board body 100, or by the combination of the above two events, it makes the bonding strength between the mounting base 3 and the board body 100 much greater than that between the mounting base 3 and the socket base 5.

Figure 8:
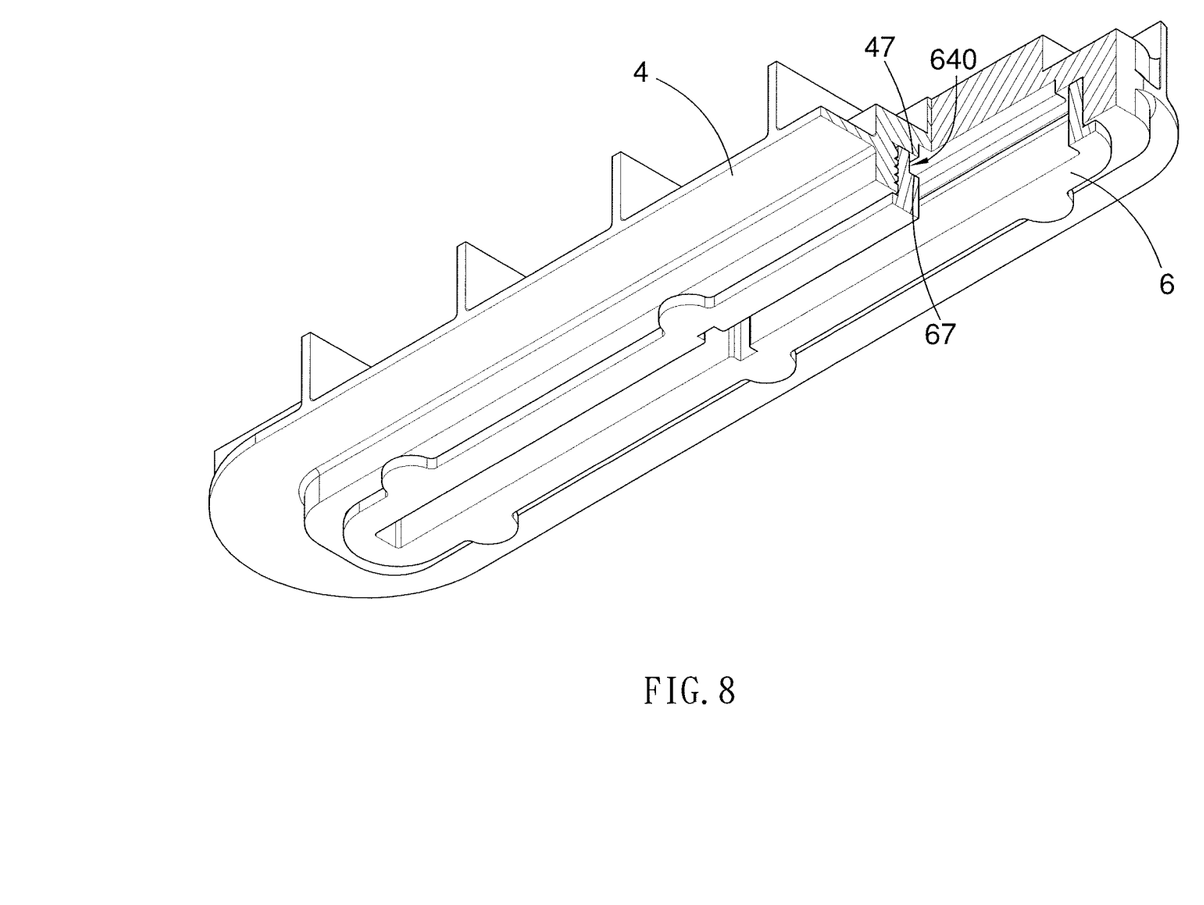
FIG. 8 is a fragmentary perspective view, partially broken away to show details of construction, of a combination of a mounting base and a socket base in accordance with another embodiment of the present invention.
Figure 9:
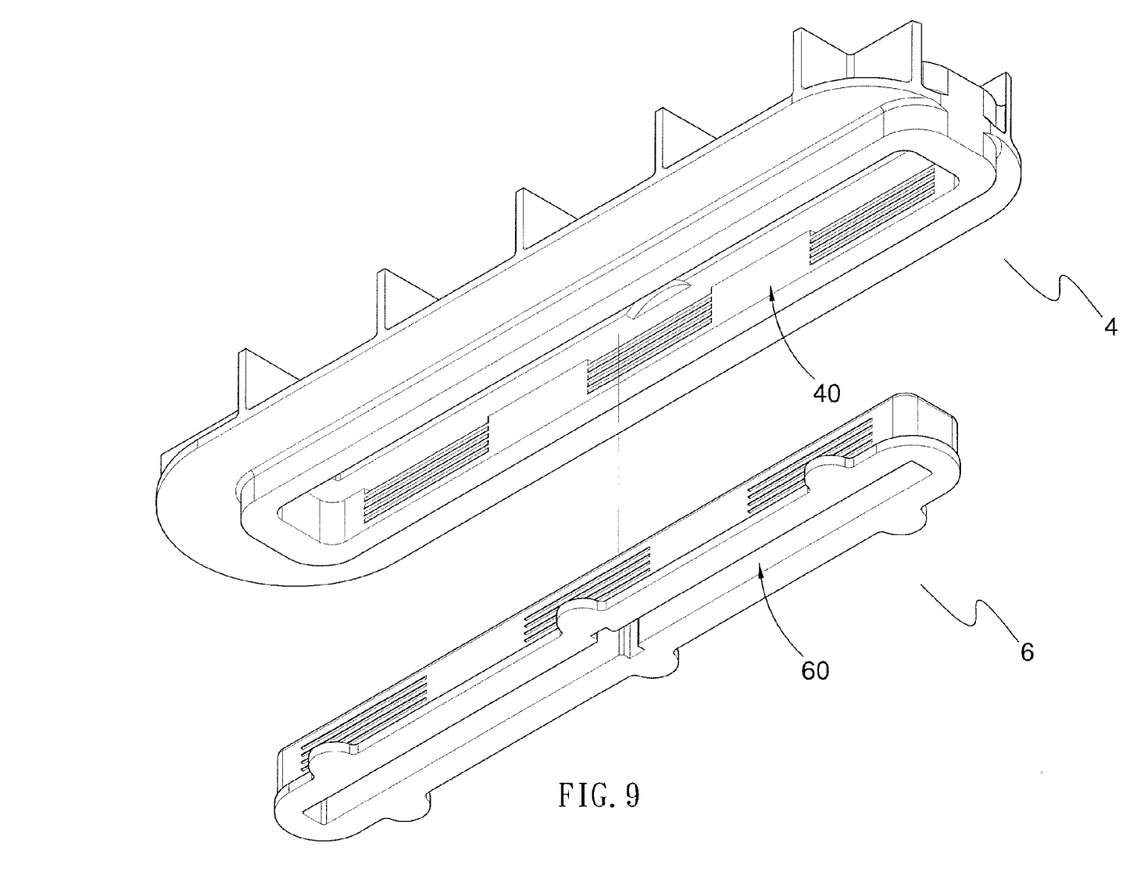
FIG. 9 is an exploded perspective view of the combination of FIG. 8.
Figure 10:
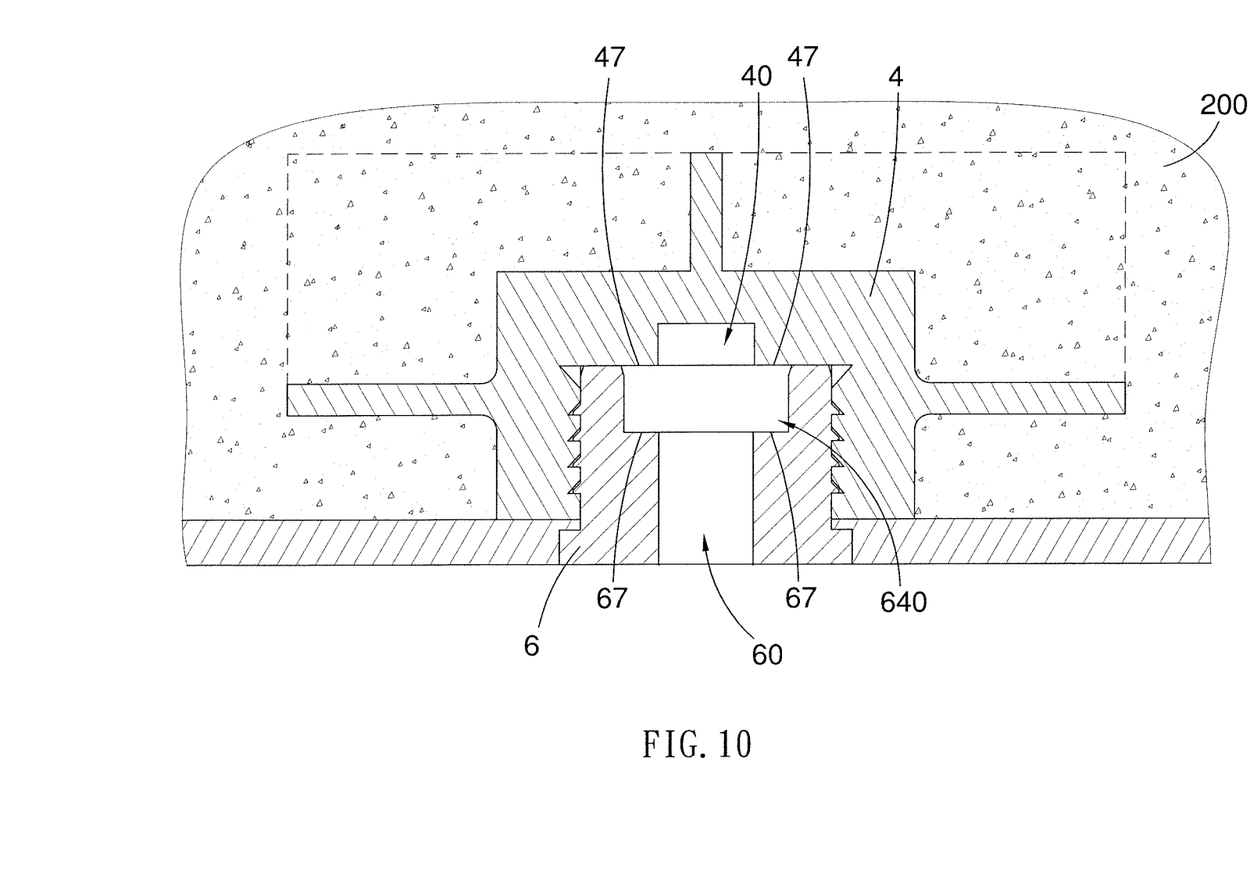
FIG. 10 illustrates a partial sectional view of a water craft, illustrating that the combination of FIG. 8 is bonded in a board body.

Referring now to FIGS. 8-10, an alternative preferred embodiment of the present invention is described. FIGS. 8 and 9 show a combination of an alternative mounting base 4 and socket base 6. Similar to the mounting base 3 and socket base 5 in FIGS. 1 and 2, the mounting base 4 and socket base 6 of this embodiment are adapted to join with a fin (not shown) to form a fin assembly. As shown in FIG. 10, the mounting base 4 is bonded within a watercraft, such as board 200 and has a stepped cavity 40 and a pair of shoulders 47 in the cavity 40. The socket base 6 defines from top to bottom a stepped through hole 60 and has a pair of shoulder 67 in the through hole 60. And the shoulders 67 of the socket base 6 are opposed to the shoulders 47 of the mounting base 4 with gaps 640 therebetween for receiving an accessory, such as a fin, lease, handle, or any other accessory. In this embodiment, the fin assembly of the present invention is also contemplated for use within the upper surface of the watercraft and as such a variety of other accessories are contemplated, including towing attachments for securing the board to a line, kite or sail attachment for coupling with a sail or kite, paddle attachments, oar attachments, other attachment for securing products such as a paddle or fishing equipment to the board, or any other accessory utilized with watercraft as is known or reasonably could be contemplated.

The foregoing description is for purposes of illustration only and is not intended to limit the scope of the protection accorded this invention. The scope of protection is to be measured by the following claims, which should be interpreted as broadly as the inventive contribution permits.

What is claimed is:

1. A fin assembly, comprising:
    a mounting base provided for permanent inclusion in a watercraft and bonding with the watercraft, the mounting base having a cavity therein, wherein the cavity has multiple inner wall surfaces and an opening exposed at a surface of the watercraft;
    a socket base mounted in the cavity of the mounting base through the opening, bonding with the mounting base and defining a recess; and
    a fin including a spigot inserted in the recess of the socket base;
    wherein, bonding strength between the mounting base and the watercraft is greater than that between the mounting base and the socket base so that the socket base is detachable from the mounting base upon application of a force while leaving the mounting base attached to the watercraft;
    the socket base further comprises multiple teeth formed along an outer side surface thereof, each of the teeth having an oblique surface and a horizontal obstructing surface, and the mounting base further comprises multiple grooves formed along the inner wall surfaces of the cavity, each of the grooves forming a horizontal surface, and wherein the oblique surfaces are defined to guide the socket base smoothly into the cavity of the mounting base, and the horizontal obstructing surfaces are defined to abut against the horizontal surfaces so that the socket base can be engaged with the mounting base with the teeth being lodged in the grooves.

2. The fin assembly of claim 1 further comprising a fastening element, wherein the socket base defines a passageway obliquely extending from the outer surface of the socket base and intersecting the recess of the socket base, and the fastening element is disposed in the passageway and extending into the recess of the socket base and in contact with the spigot of the fin.

3. The fin assembly of claim 1, wherein the mounting base includes a plurality of reinforcing ribs arranged on a periphery thereof.

4. A water craft, comprising:
    a watercraft body comprising a foam material and having an upper surface and a lower surface;
    a mounting base embedded within the lower surface of the watercraft body, bonding with the watercraft body and defining a cavity therein, wherein the cavity defines an opening, a top surface and multiple parallel inner wall surfaces extended from the top surface to the opening; and
    a socket base mounted in the cavity of the mounting base through the opening, bonding with the mounting base and having a recess in which an accessory is to be inserted;
    wherein, bonding strength between the mounting base and the watercraft body is greater than that between the mounting base and the socket base so that the socket base is detachable from the mounting base upon application of a force while leaving the mounting base attached to the watercraft body;
    the socket base further comprises multiple teeth formed along at least one outer side thereof, each of the teeth having an oblique surface and a horizontal obstructing surface, and the mounting base further comprises multiple grooves along the inner wall surfaces of the cavity, each of the grooves forming a horizontal surface, and wherein the oblique surfaces are defined to guide the socket base smoothly into the cavity of the mounting base, and the horizontal obstructing surfaces are defined to abut against the horizontal surfaces so that the socket base can be engaged with the mounting base with the teeth being lodged in the grooves.

5. The water craft of claim 4 further comprising a fastening element, wherein the socket base defines a passageway obliquely extending from the outer surface of the socket base and intersecting the recess of the socket base, and the fastening element is disposed in the passageway for retention of the accessory in the socket base.

6. The water craft of claim 4, wherein the mounting base comprises a plurality of reinforcing ribs arranged on a periphery thereof.

7. A water craft, comprising:
    a board body comprising a foam material;
    an accessory;
    a mounting base embedded in the board body, bonding with the board body and defining a cavity therein, wherein the cavity has an opening exposed at a surface of the board body; and
    a socket base mounted in the cavity of the mounting base through the opening, bonding with the mounting base and having a recess in which the accessory is to be inserted;
    wherein, bonding strength between the mounting base and the board body is greater than that between the mounting base and the socket base so that the socket base is detachable from the mounting base upon application of a force while leaving the mounting base attached to the board body;
    the socket base comprises multiple teeth formed along an outer side surface thereof, each of the teeth having an oblique surface and a horizontal obstructing surface; and the mounting base has a plurality of grooves defined in an inner wall surface of the cavity, each of the grooves forming a horizontal surface, wherein the oblique surfaces are defined to guide the socket base smoothly into the cavity of the mounting base, and the horizontal obstructing surfaces are defined to abut against the horizontal surfaces so that the socket base can be engaged with the mounting base with the teeth being lodged in the grooves.

8. The water craft of claim 7, wherein the accessory comprises a fin.

9. The water craft of claim 7 further comprising a fastening element, wherein the socket base defines a passageway obliquely extending from the outer surface of the socket base and intersecting the recess of the socket base, and the fastening element is disposed in the passageway for retention of the accessory in the socket base.

10. The water craft of claim 7, wherein the mounting base comprises a plurality of reinforcing ribs arranged on a periphery thereof.

11. The water craft of claim 7, wherein the mounting base is embedded into the upper surface of the board.

\* \* \* \* \*